United States Patent Office 2,898,340
Patented Aug. 4, 1959

2,898,340

2,2-DIARYL-ω-(4'-PHENYL-1'-PIPERIDINO) ALKANONITRILES

Paul A. J. Janssen, Vosselaar, near Turnhout, Belgium

No Drawing. Application March 14, 1958
Serial No. 721,331

Claims priority, application Netherlands July 5, 1957

8 Claims. (Cl. 260—294.3)

The present invention relates to derivatives of 2,2-diaryl - ω - (4' - phenyl - 1' - piperidino) butyronitriles and valeronitriles. More particularly this invention is concerned with the compounds of the general structural formula

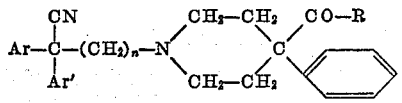

and the salts thereof, wherein Ar and Ar' are aryl hydrocarbon radicals, preferably of less than nine carbon atoms, n is two or three and R is a lower alkyl group, an alkyloxy group, alkenyloxy group, a cycloalkyloxy group or an aralkyloxy group.

In the foregoing structural formula the radicals Ar and Ar' can represent phenyl, tolyl, or xylyl groups. The radical R can be a lower alkyl group such as methyl, ethyl, straight-chained or branched propyl, butyl, amyl, or hexyl. The radical R can also represent a lower alkyloxy radical preferably of less than eight carbon atoms wherein the alkyl group is of the same type as R or is heptyl. Highly active substances are also obtained where the group R is a corresponding alkenyloxy group such as allyloxy, butenyloxy, methallyloxy, pentenyloxy and the like. The radical R can furthermore represent such lower cycloalkyloxy groups as cyclopentoxy and cyclohexoxy. Highly potent compounds are also obtained where the radical R represents such aralkyloxy groups as phenethoxy, phenylpropoxy, benzyloxy and the like.

The organic bases of this invention form non-toxic, acid-addition salts with a variety of organic and inorganic acids. Such salts are formed with such acids as sulfuric, phosphoric, hydrochloric, hydrobromic, hydriodic, sulfamic, citric, lactic, maleic, malic, succinic, tartaric, cinnamic, acetic, benzoic, gluconic, ascorbic and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethylsulfate, diethylsulfate, methyl benzenesulfonate, ethyl toluenesulfonate, ethylene chlorohydrin, propylene chlorohydrin, allyl bromide, methallyl bromide and crotyl bromide.

The esters of this invention are conveniently prepared by the condensation of a 2,2-diaryl-4-halobutyronitrile or 2,2-diaryl-5-halovaleronitrile with an equivalent of the corresponding ester of 4-phenylisonipecotic acid. The 2,2-diarylhaloalkanonitriles used as starting materials are prepared according to the method of Dupré et al., J.C.S., 1949:505. The esters of 4-phenylisonipecotic acid are prepared by the conventional esterification procedures. Since in this condensation an equivalent of hydrogen halide is liberated, it is necessary to use either an excess of the isonipecotic acid derivative or to use one equivalent of another base to combine with the acid. The condensation can be carried out in such solvents as the aromatic hydrocarbons of six to nine carbon atoms, the lower alkanols and alkanones. An obvious equivalent method is to use the free 4-arylisonipecotic acid in lieu of the ester, typically in an alcoholic solvent in the presence of a base such as sodium carbonate, and to esterify the 2,2-diaryl-ω-(4'-carboxy-4'-phenyl-1'-piperidino)alkanonitrile thus produced.

For the preparation of the ketones, wherein the radical R represents a lower alkyl group, the corresponding 4-aryl-4-alkanoylpiperidines are substituted for the isonipecotic acid derivatives.

An alternate procedure employs as a starting material a diarylacetonitrile which is reacted with a metallorganic reagent to form the α-metallo derivative

which is then condensed with a corresponding 1-haloalkylpiperidine derivative of the formula

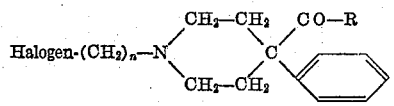

with elimination of the metal halide, M-Halogen.

The compounds of this invention are highly active inhibitors of gastro-intestinal propulsion and defecation and are therefore useful in the treatment of diarrhea. They are preferable in use over morphine derivatives in that they do not produce analgesic effects in therapeutic dosage. Also, unlike some other drugs used in the treatment of diarrhea, these compounds are devoid of parasympathicolytic activity in therapeutic dosage.

The compounds which constitute this invention and the methods for their preparation will appear more fully from a consideration of the following examples, which are given for the purpose of illustration only and are not to be construed as limiting the invention in spirit or in scope. In these examples quantities are indicated as parts by weight.

*Example 1*

In a sealed pressure reactor a mixture of 23 parts of the methyl ester of 4-phenylisonipecotic acid and 15 parts of 2,2-diphenyl-4-bromobutyronitrile in 90 parts xylene is heated at 120° C. for 24 hours. The mixture is then cooled and filtered. The filtrate is extracted with dilute hydrochloric acid, rendered alkaline with aqueous sodium hydroxide and then extracted with ether. Through the ether solution gaseous hydrogen chloride is led to cause precipitation of the hydrochloride of the methyl ester of 2,2-diphenyl-4-(4'-carboxy-4'-phenyl-1'-piperidino)butyronitrile which melts at about 180–181° C. The compound has the structural formula

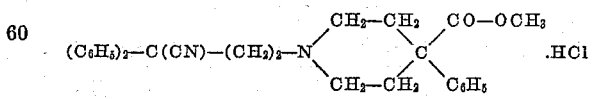

*Example 2*

A mixture of 23 parts of the ethyl ester of 4-phenylisonipecotic acid and 15 parts of 2,2-diphenyl-4-bromobutyronitrile in 19 parts of xylene is heated for 24 hours at 100–120° C. and then cooled and filtered to remove the precipitate of the hydrobromide of the ethyl ester of 4-phenylisonipecotic acid. The filtrate is then extracted with dilute hydrochloric acid and the extract is rendered alkaline by addition of concentrated aqueous potassium hydroxide and extracted with ether. This ether extract is treated with gaseous hydrogen chloride. The resulting precipitate is collected on a filter. The hydrochloride of the ethyl ester of 2,2-diphenyl-4-(4'-carboxy-4'-phenyl-1'-piperidino) butyronitrile thus obtained melts at about 220.5–222° C.

*Example 3*

In a sealed reactor a mixture of 46 parts of the ethyl ester of 4-phenylisonipecotic acid and 31 parts of 2,2-diphenyl-5-bromovaleronitrile is heated at about 110° C. for 24 hours. After cooling and filtration the filtrate is extracted with dilute hydrochloric acid and the extract is rendered alkaline and extracted with ether. Treatment of the ether solution with slightly more than one molecular equivalent of a 25% solution of hydrogen chloride in 2-propanol and cooling yields the hydrochloride of the ethyl ester of 2,2-diphenyl-5-(4'-carboxy-4'-phenyl-1'-piperidino) valeronitrile melting at about 201–203° C.

*Example 4*

In a pressure reactor a mixture of 49 parts of the normal propyl ester of 4-phenylisonipecotic acid and 30 parts of 2,2-diphenyl-4-bromobutyronitrile in 200 parts of butanone is heated for 24 hours and then cooled and filtered. The filtrate is extracted with dilute hydrochloric acid and the acidic solution is rendered alkaline and extracted with ether. Treatment of the ether solution with gaseous hydrogen chloride yields the hydrochloride of the propyl ester of 2,2-diphenyl-4-(4'carboxy-4'-phenyl-1'-piperidino)butyronitrile melting at about 224–225° C.

*Example 5*

A mixture of 49 parts of the normal propyl ester of 4-phenylisonipecotic acid and 31 parts of 2,2-diphenyl-5-bromovaleronitrile in 200 parts of xylene is heated in a bomb at 100° C. The contents of the bomb are then cooled and filtered and the filtrate is extracted with dilute acid. The extract is rendered alkaline and extracted with ether. Treatment of the ether solution with gaseous hydrogen chloride yields the hydrochloride of the propyl ester of 2,2-diphenyl-5-(4'-carboxy-4'-phenyl-1'-piperidino)valeronitrile melting at about 197–198° C.

*Example 6*

Substitution of the isopropyl ester of 4-phenylisonipecotic acid for the normal propyl ester used in Example 4 yields the isopropyl ester of 2,2-diphenyl-4-(4'-carboxy-4'-phenyl-1'-piperidino)butyronitrile as a hydrochloride melting at about 230.5–232.5° C.

*Example 7*

A mixture of 49 parts of the allyl ester of 4-phenylisonipecotic acid and 30 parts of 2,2-diphenyl-4-bromobutyronitrile in 200 parts of xylene is heated at 110° C. for 24 hours, cooled and filtered. The filtrate is extracted with acid and the acid extract is rendered alkaline and extracted with ether. The ether solution is treated with gaseous hydrogen chloride, and on cooling there precipitates the hydrochloride of the allyl ester of 2,2-diphenyl-4-(4'-carboxy-4'-phenyl-1'-piperidino)butyronitrile melting at about 204.5–206° C.

*Example 8*

A mixture of 51 parts of the methallyl ester of 4-phenylisonipecotic acid with 33 parts of 2,2-di-(p-tolyl)-4-bromobutyronitrile in 230 parts of xylene is heated in a sealed reactor at 120° C. for 20 hours. After cooling the reaction mixture is filtered and the filtrate is extracted with dilute hydrochloric acid. The acid solution is rendered alkaline and extracted with ether. The ether solution is dried over anhydrous calcium sulfate, filtered and evaporated to yield the methallyl ester of 2,2-di-(p-tolyl)-4-(4'-carboxy-4'-phenyl-1'-piperidino)butyronitrile which has the structural formula

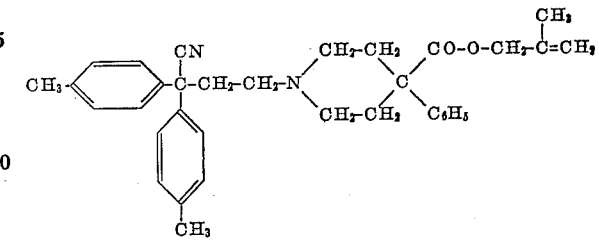

*Example 9*

A mixture of 51 parts of the butyl ester of 4-phenylisonipecotic acid and 30 parts of 2,2-diphenyl-4-bromobutyronitrile are heated in a bomb at about 100–120° C., cooled and filtered. The filtrate is extracted with dilute hydrochloric acid and the acid extract is rendered alkaline and extracted with ether. Treatment of the ether solution with hydrogen chloride causes precipitation of the hydrochloride of the butyl ester of 2,2-diphenyl-4-(4'-carboxy - 4' - phenyl - 1' - piperidino)butyronitrile which melts at about 208–208.5° C.

*Example 10*

A mixture of 54 parts of the pentyl ester of 4-phenylisonipecotic acid and 30 parts of 2,2-diphenyl-4-bromobutyronitrile in 200 parts of xylene is heated in a closed vessel for 24 hours, cooled and filtered. The filtrate is extracted with acid. The acid extract is rendered alkaline and extracted with ether. Treatment of the ether extract with gaseous hydrogen chloride causes formation of the hydrochloride of the pentyl ester of 2,2-diphenyl-4-(4'-carboxy-4'-phenyl-1'-piperidino)butyronitrile melting at about 197.5–198.5° C.

*Example 11*

Reaction of 28 parts of the normal hexyl ester of 4-phenylisonipecotic acid with 15 parts of 2,2-diphenyl-4-bromobutyronitrile in 100 parts of xylene and workup by the procedure of the preceding example yields the hydrochloride of the hexyl ester of 2,2-diphenyl-4-(4'-carboxy-4'-phenyl-1'-piperidino)butyronitrile melting at about 189–190° C.

*Example 12*

Reaction of a mixture of 78.5 parts of the heptyl ester of 4-phenylisonipecotic acid and 30 parts of 2,2-diphenyl-4-bromobutyronitrile in 250 parts of xylene and workup as in the preceding example yields the hydrochloride of the heptyl ester of 2,2-diphenyl-4-(4'-carboxy-4'-phenyl-1'-piperidino)butyronitrile melting at about 189–191.5° C.

*Example 13*

Reaction of 28 parts of the cyclohexyl ester of 4-phenylisonipecotic acid and 15 parts of 2,2-diphenyl-4-bromobutyronitrile and workup as in the preceding example yields the hydrochloride of the cyclohexyl ester of 2,2-diphenyl-4-(4'-carboxy - 4' - phenyl-1'-piperidino)-butyronitrile melting at about 217–220° C.

*Example 14*

A mixture of 26.7 parts of the cyclopentyl ester of 4-phenylisonipecotic acid and 16.4 parts of 2-(2,4-xylyl)-2-phenyl-4-bromobutyronitrile in 100 parts of xylene is heated at 110° C. for 15 hours, cooled and filtered. The filtrate is extracted with dilute hydrochloric acid and the extract is washed with ether, rendered alkaline and extracted with ether. The ether extract is dried over anhydrous calcium sulfate, filtered and evaporated to yield the cyclopentyl ester of 2-(2,4-xylyl)-2-phenyl-4-(4'-carboxy-4'-phenyl-1'-piperidino)butyronitrile which has the structural formula

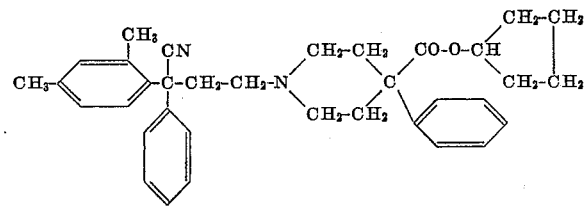

Example 15

A mixture of 40 parts of the β-phenethyl ester of 4-phenylisonipecotic acid and 15 parts of 2,2-diphenyl-4-bromobutyronitrile in 200 parts of xylene is heated at 100–120° C. for 24 hours, cooled and filtered. The filtrate is extracted with acid, and the acid extract is rendered alkaline and extracted with ether. Treatment of the ether solution with gaseous hydrogen chloride yields the hydrochloride of the phenethyl ester of 2,2-diphenyl - 4 - (4' - carboxy - 4' - phenyl - 1' - piperidino)-butyronitrile melting at about 184–187° C.

Example 16

A mixture of 77 parts of the benzyl ester of 4-phenylisonipecotic acid and 30 parts of 2,2-diphenyl-4-bromobutyronitrile in 200 parts of xylene is heated for 24 hours, cooled and filtered. The filtrate is extracted with dilute hydrochloric acid. This extract is washed with ether, rendered alkaline, and extracted with ether. The ether extract is dried over anhydrous calcium sulfate, filtered and evaporated to yield the benzyl ester of 2,2-diphenyl - 4 - (4' - carboxy - 4' - phenyl - 1' - piperidino)-butyronitrile.

Example 17

Reaction of 82.5 parts of the γ-phenylpropyl ester of 4-phenylisonipecotic acid with 25.6 parts of 2,2-diphenyl-4-chlorobutyronitrile in 200 parts of xylene for 36 hours at 120° C. and workup as in the preceding example yields the γ-phenylpropyl ester of 2,2-diphenyl-4-(4'-carboxy-4'-phenyl-1'-piperidino)butyronitrile.

Example 18

A mixture of 43 parts of 4-propanoyl-4-phenylpiperidine and 30 parts of 2,2-diphenyl-4-bromobutyronitrile in 200 parts of xylene is heated at 100–120° C. for 24 hours, cooled and filtered. The filtrate is extracted with dilute hydrochloric acid. The acidic extract is rendered alkaline and extracted with ether. The ether extract is treated with gaseous hydrogen chloride to yield the hydrochloride of 2,2-diphenyl - 4 - (4' - propanoyl - 4' - phenyl - 1'-piperidino)butyronitrile melting at about 229.5–231° C.

Example 19

Reaction of 90 parts of 4-propanoyl-4-phenylpiperidine and 65 parts of 2,2-diphenyl-5-bromovaleronitrile in 500 parts of toluene at 100° C. for 24 hours followed by the workup of the preceding example yields the hydrochloride of 2,2-diphenyl - 5 - (4'-propanoyl-4'-phenyl-1'-piperidino)valeronitrile melting at about 210–212° C.

Example 20

A mixture of 23 parts of 4-butanoyl-4-phenyl-piperidine and 15 parts of 2,2-diphenyl-4-bromobutyronitrile in 100 parts of xylene at 100–120° C. and workup as in the preceding example yields 2,2-diphenyl-4-(4'-butanoyl-4'-phenyl-1'-piperidino)butyronitrile melting at about 227–228.5° C.

Example 21

Reaction of 96 parts of 4-butanoyl-4-phenylpiperidine and 65 parts of 2,2-diphenyl-5-bromovaleronitrile in 500 parts of benzene in a sealed pressure reactor at 100–120° C. for 24 hours and workup as in the preceding example yields the hydrochloride of 2,2-diphenyl-4-(4'-butanoyl-4'-phenyl-1'-piperidino)valeronitrile melting at about 236–238° C.

Example 22

To a stirred suspension of 7 parts of sodamide in 90 parts of benzene maintained at 30–35° C. there is added a solution of 33 parts of diphenylacetonitrile in 70 parts of benzene. This mixture is then refluxed for an hour, cooled and treated by portionwise addition with one equivalent of the propyl ester of 1-(2-chloroethyl)-4-phenylisonipecotic acid in 45 parts of xylene at 30–40° C. The resulting mixture is refluxed for 2 hours, cooled, filtered and extracted with dilute hydrochloric acid. The acidic extract is rendered alkaline and extracted with ether. The ether extract is treated with gaseous hydrogen chloride to yield the hydrochloride of the propyl ester of 2,2-diphenyl-4-(4'-carboxy - 4' - phenyl-1'-piperidino)-butyronitrile melting at about 224–225° C.

Substitution of an equivalent amount of the di-(2,5-xylyl)acetonitrile in the above procedure yields the 2,2-di-(2,5-xylyl) - 4 - (4' - carboxy - 4' - phenyl - 1' - piperidino)butyronitrile propyl ester hydrochloride of the structural formula

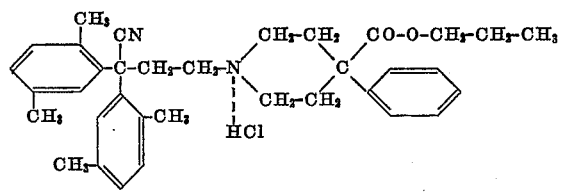

What is claimed is:
1. A compound of the structural formula

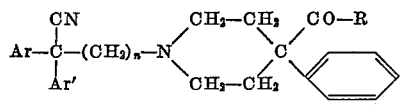

where Ar and Ar' are aryl hydrocarbon radicals of less than 9 carbon atoms, n is an integer greater than 1 and smaller than 4 and R is a member of the group consisting of lower alkyl, O-alkyl radicals of less than 8 carbon atoms, -O-(lower alkenyl), -O-cyclopentyl, -O-cyclohexyl, and -O-(lower alkylene)-phenyl radicals.

2. A compound of the structural formula

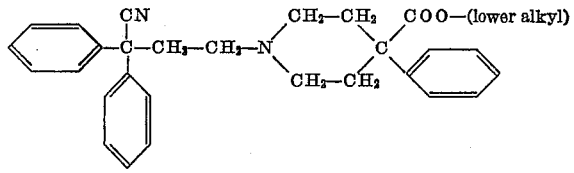

3. Ethyl ester of 2,2-diphenyl-4-(4'-carboxy-4'-phenyl-1'-piperidino)butyronitrile.
4. Butyl ester of 2,2-diphenyl-4-(4'-carboxy-4'-phenyl-1'-piperidino)butyronitrile.
5. Lower alkenyl ester of 2,2-diphenyl-4-(4'-carboxy-4'-phenyl-1'-piperidino)butyronitrile.
6. Allyl ester of 2,2-diphenyl-4-(4'-carboxy-4'-phenyl-1'-piperidino)butyronitrile.
7. A compound of the structural formula

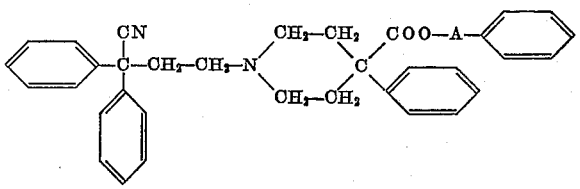

wherein A is a lower alkylene radical.
8. Phenethyl ester of 2,2-diphenyl-4-(4'-carboxy-4'-phenyl-1'-piperidino)butyronitrile.

No references cited.